Nov. 19, 1935.                    W. N. SMITH                    2,021,154
                          BELLOW TIRE INFLATING DEVICE
                   Original Filed May 11, 1932    5 Sheets-Sheet 3
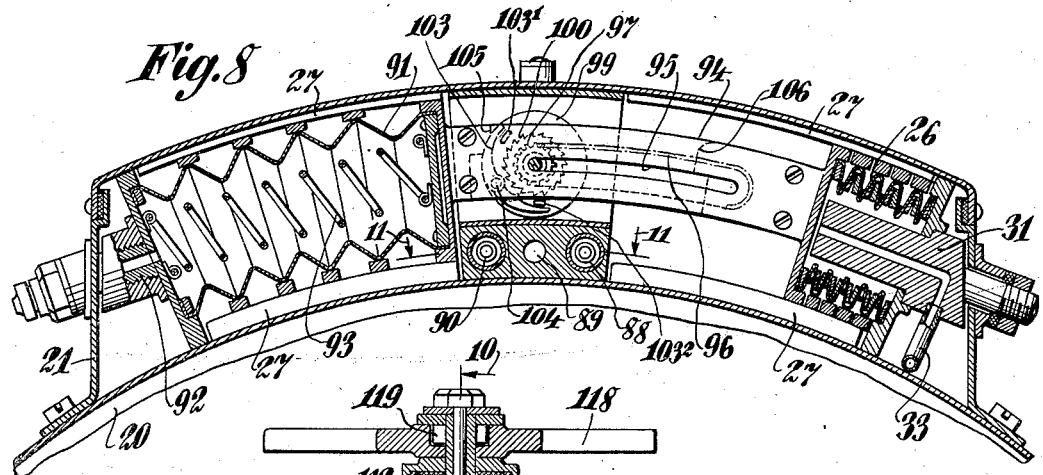
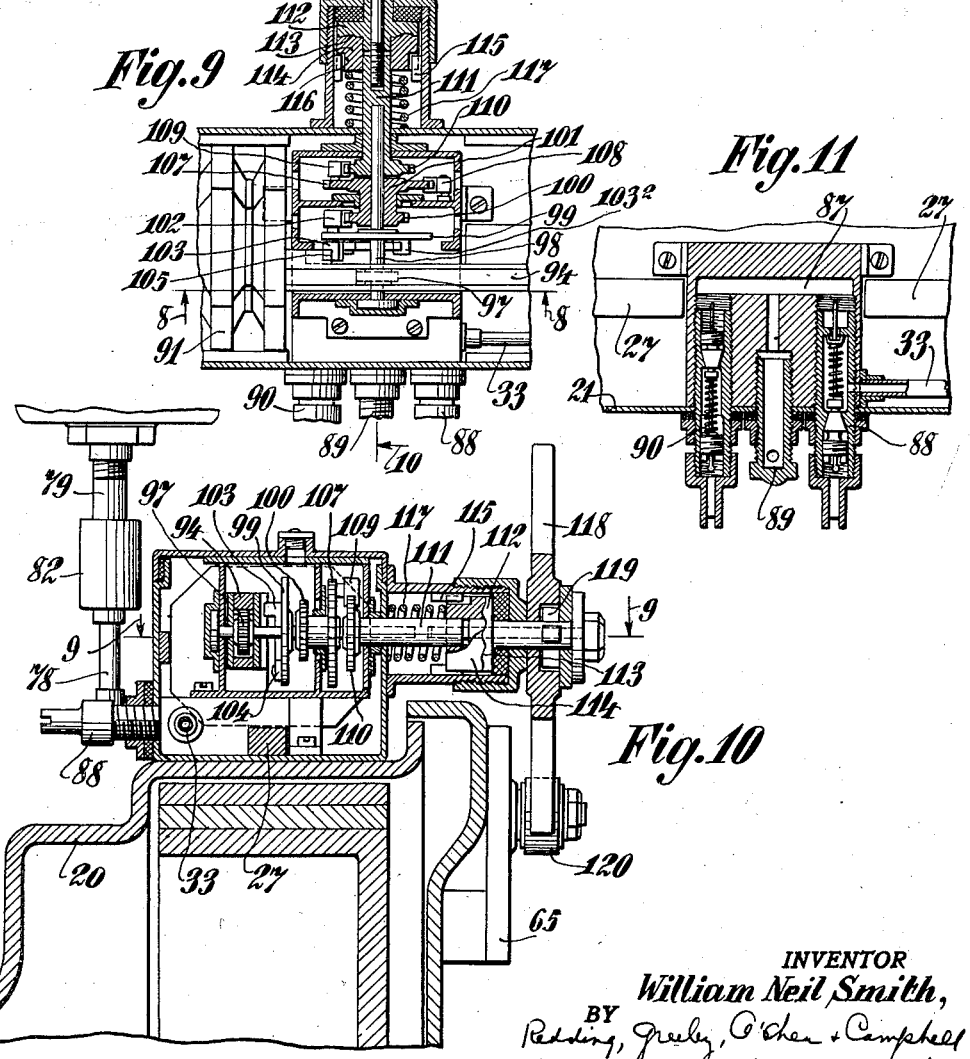
INVENTOR
William Neil Smith,
BY Redding, Greeley, O'Shea & Campbell
HIS ATTORNEYS

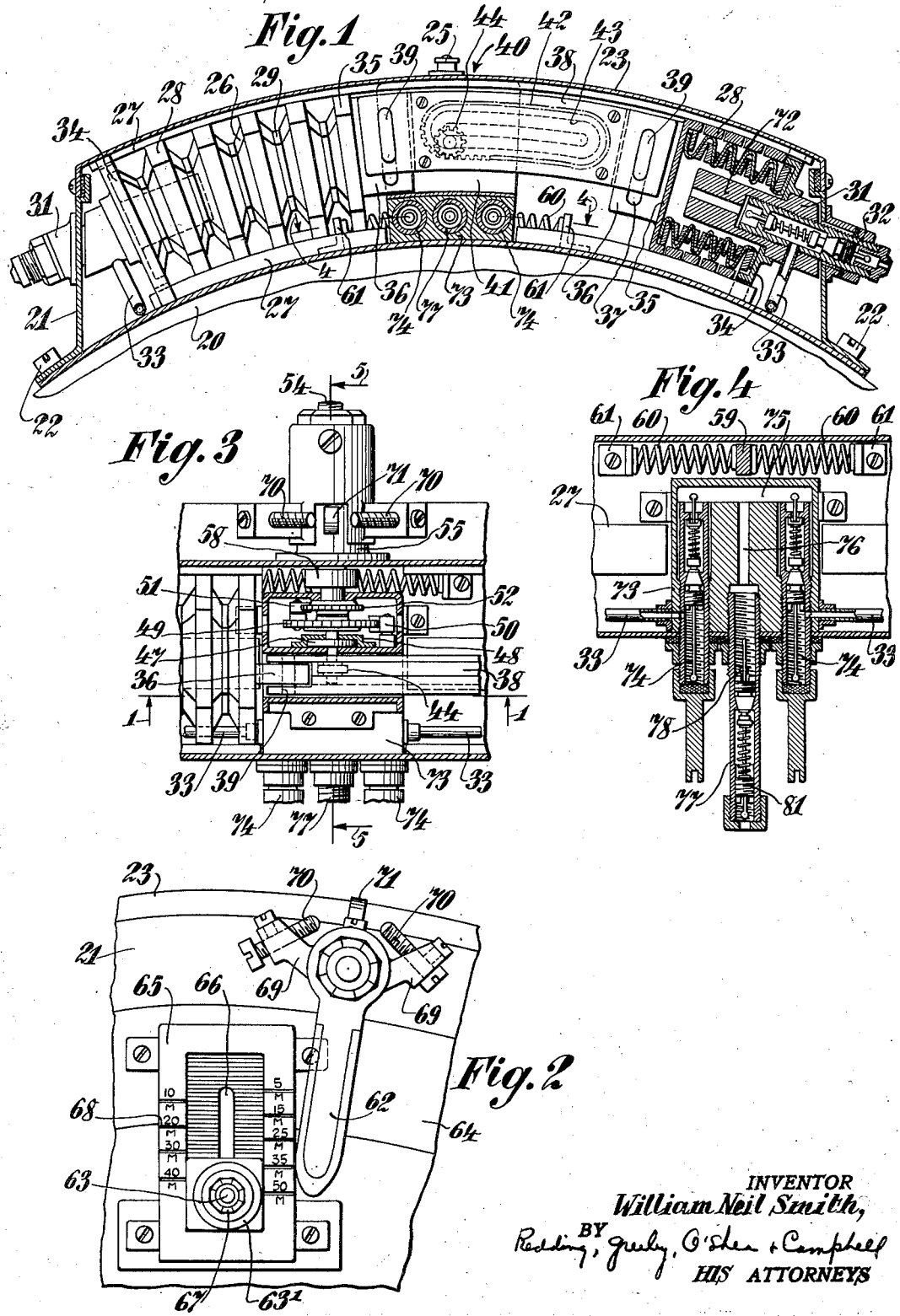
Nov. 19, 1935. W. N. SMITH 2,021,154
BELLOW TIRE INFLATING DEVICE
Original Filed May 11, 1932  5 Sheets-Sheet 1

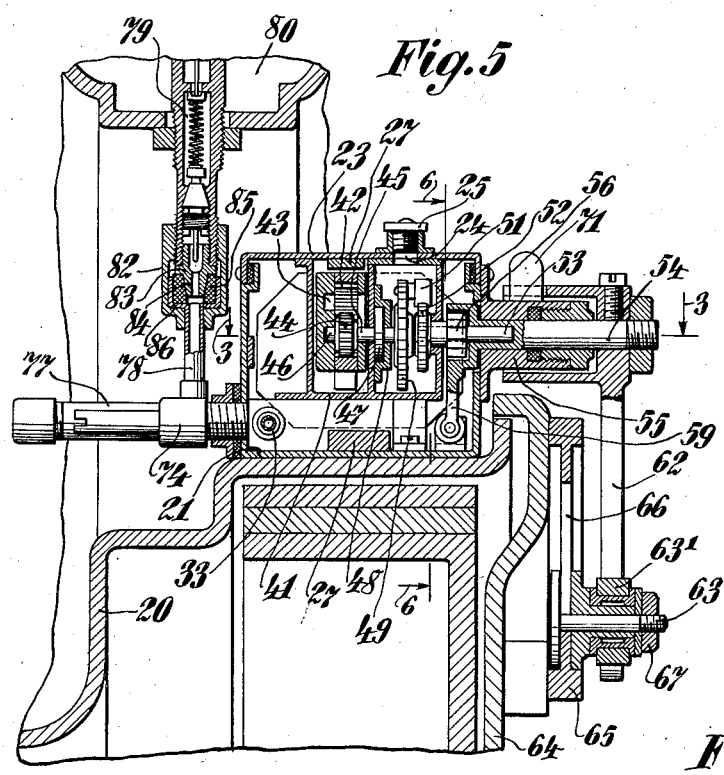
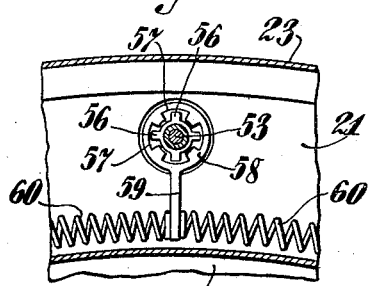
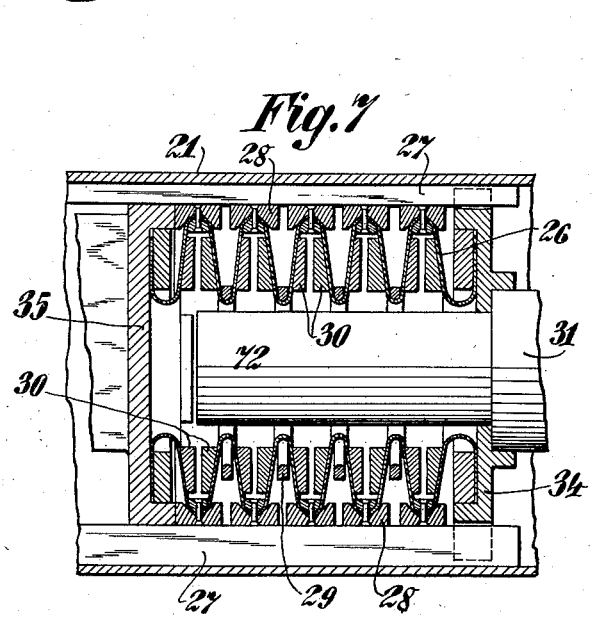

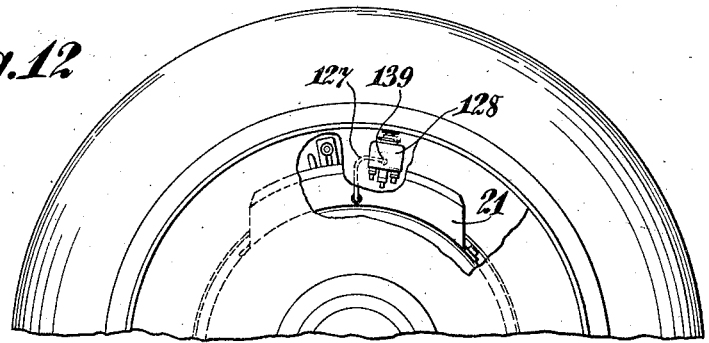
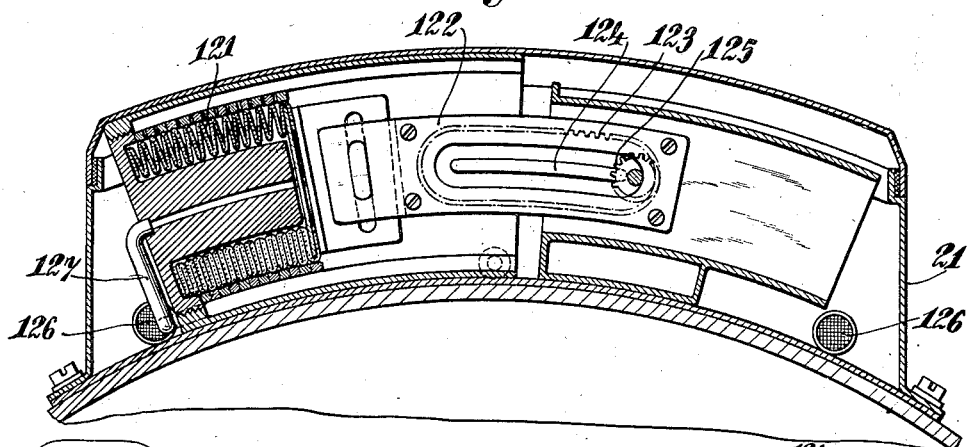
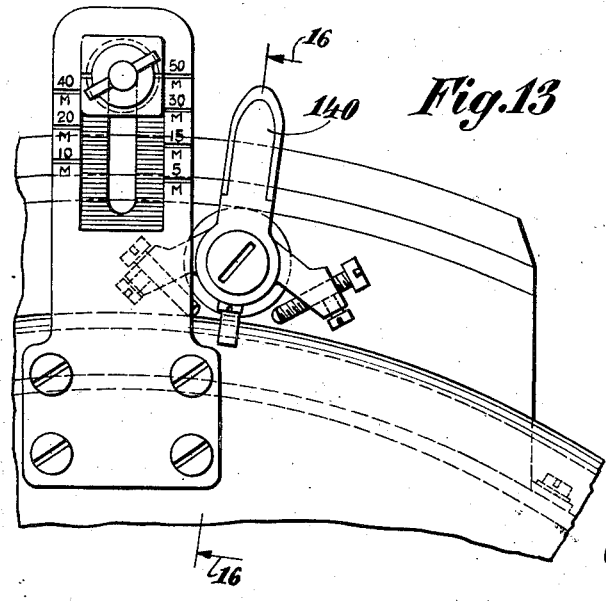
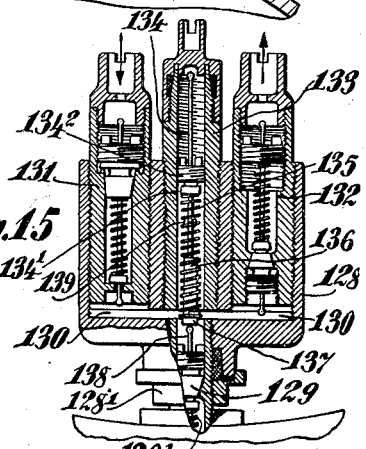

Nov. 19, 1935. W. N. SMITH 2,021,154
BELLOW TIRE INFLATING DEVICE
Original Filed May 11, 1932   5 Sheets-Sheet 5

INVENTOR
William Neil Smith,
BY
Redding, Greeley, O'Shea + Campbell
HIS ATTORNEYS Patented Nov. 19, 1935

2,021,154

UNITED STATES PATENT OFFICE 2,021,154

BELLOWS TIRE INFLATING DEVICE

William Neil Smith, New York, N. Y.

Application May 11, 1932, Serial No. 610,539
Renewed November 3, 1933

5 Claims. (Cl. 230—160)

The present invention relates to inflating mechanisms for vehicle tires and embodies, more specifically, an improved automatic tire inflating device actuated by the relative rotation between a vehicle wheel and a stationary part of the vehicle, such as a brake drum or spider mounted upon the vehicle axle or other non-rotating part of the vehicle.

Devices have been provided heretofore to utilize the rotation of a vehicle wheel to effect the pumping of a tire but have proved unsuccessful because no adequate means has been provided for controlling the pressure of the air, or the quantity or rate of pumping air into the tire. Further objections to existing structures include the ineffectiveness of the mechanism for pumping air into the tire and the provision of a device which will function adequately and with proper protection from the elements within the extremely limited space afforded upon existing types of vehicle wheels for mechanisms of this character without change being required in the construction of wheels or tires.

The present invention, accordingly, has for an object, the provision of a tire inflating device which may be regulated for both the pressure and quantity of air to be maintained in the tire, and which is sufficiently small to be received upon a present standard type vehicle wheel within the space thereon adapted to receive such devices.

A further object of the invention is to provide an inflating device, the parts of which are effectively sealed from the outside elements whereby lubrication and maintenance thereof is greatly facilitated.

A further object of the invention is to provide an improved mechanism of the above character wherein provision is made for the rotation of a wheel in opposite directions without injuring the mechanism.

Further objects will be aparent as the invention is described in greater detail in connection with the accompanying drawings, wherein:

Figure 1 is a view in longitudinal section taken through an inflating device constructed in accordance with the present invention taken on the section line 1—1 of Figure 3, and looking in the direction of the arrows.

Figure 2 is a detail view showing the mechanism for actuating the pumping device.

Figure 3 is a view in section, taken on line 3—3 of Figure 5, and looking in the direction of the arrows.

Figure 4 is a view in section, taken on line 4—4 of Figure 1, and looking in the direction of the arrows.

Figure 5 is a view in section, taken on line 5—5 of Figure 3, and looking in the direction of the arrows.

Figure 6 is a view in section, taken on line 6—6 of Figure 5, and looking in the direction of the arrows.

Figure 7 is a sectional view of the bellows construction of the present invention.

Figure 8 is a view in section, similar to Figure 1, taken on line 8—8 of Figure 9, and looking in the direction of the arrows.

Figure 9 is a view in section, taken on the line 9—9 of Figure 10 and looking in the direction of the arrows.

Figure 10 is a view in section, taken on line 10—10 of Figure 9, and looking in the direction of the arrows.

Figure 11 is a view in section, taken on line 11—11 of Figure 8, and looking in the direction of the arrows.

Figure 12 is a view in side elevation, partly broken away and in section, showing the manner in which the device of Figures 8, 9, 10, and 11 may be mounted upon a vehicle tire.

Figure 13 is a view in side elevation looking in the opposite direction from the direction in which Figure 12 is taken, showing the actuating mechanism for the inflating device.

Figure 14 is a view similar to Figure 8, showing a modified form of the invention.

Figure 15 is a detail view showing the valve regulating mechanism of Figure 12.

Figure 16:
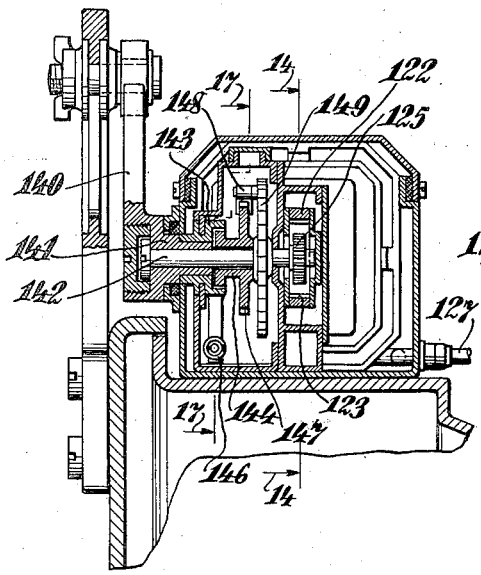
Figure 16 is a view in section, taken on line 16—16 of Figure 13, and looking in the direction of the arrows.

With reference to the above drawings, particularly Figures 1 through 7, the brake drum 20 or other suitable rotating elements carried by a motor vehicle wheel is shown as provided with a housing 21. This housing may be secured to the brake drum or other suitable rotating element by means of screws 22 and is provided with a cover 23 which may be removably secured thereto in order that the interior of the housing may be effectively sealed. An aperture 24 is provided with a movable cap 25 to enable a fluid such as a lubricant to be introduced into the housing.

Within the housing, air-tight bellows 26 are provided, the axes of the bellows lying in circumferential lines which are concentric with the brake drum or other mounting structure 20, guides 27 being provided to restrict the movement of the bellows in a desired manner. Each outer fold of each of the bellows is provided with a ring 28 which has a flat bearing surface which is adapted to engage the guides 27 and each inner fold of each bellows is provided with a ring 29 which limits the axial expanding motion of the bellows to a desired extent. The rings 29 thus prevent pressure from within the bellows from expanding and rupturing or disfiguring the bellows and thus insure the proper operation thereof under all conditions. The interior flat surfaces of the bellows are formed with reinforcing and air exhausting plates 30 and fluid is discharged from the bellows at the end thereof through a fitting 31. Each fitting 31 is provided with an inlet valve 32 which permits fluid to be drawn into the bellows from the outside but prevents fluid from flowing in a reverse path from the bellows to the exterior of the housing. Discharge pipes 33 direct fluid from the respective bellows to a valve mechanism described hereinafter and the distant ends of the bellows are secured in an air-tight fashion to end plates 34. The adjacent ends of each bellows is secured in an air-tight fashion to a movable head 35 which is slidably mounted upon the tracks 27 and provided with extensions 36 which are formed with slots 37. Between the extensions 36 a connecting rod 38 is secured, the rod being provided with pins 39 which are received within slots 37, thus permitting transverse motion of the connecting rod with respect to the axis of the bellows. In the central section of the housing, a driving mechanism 40 is provided, the driving mechanism including a support 41 in which the connecting rod 38 is slidably received. The connecting rod is formed with an endless curved rack 42 having internal teeth and guide grooves 43. A driving pinion 44 is adapted to engage the teeth of a rack 42 and is mounted upon a shaft 45 which has an extension 46 to engage the guide groove 43. Rotation of shaft 45 thus causes the pinion to drive the connecting rod 38 and the teeth of the pinion follow the teeth of the rack upon the upper and lower stretches thereof as shown in Figure 1.

Shaft 45 is provided with a disc 47 which is engaged by retaining clamps 48 and the shaft is driven by a wheel 49 which is secured thereto, the wheel having ratchet teeth formed on the circumference thereof to be engaged by a stationary spring-pressed pawl 50 to prevent movement of the wheel in a backward direction. Upon the outer face of the wheel 49 a spring-pressed pawl 51 is provided, the pawl engaging the teeth of a ratchet wheel 52 which is mounted upon a shaft 53.

Shaft 53 is centered in a shaft 54 which is journaled in a fitting 55 carried by the housing 22 and motion is transmitted between shafts 53 and 54 by means of a lost motion connection which is illustrated in Figure 6. Shaft 53 is formed with a plurality of radially extending fingers 56 which are received within enlarged notches 57 formed upon a hub 58, carried by the shaft 54. An arm 59 extends downwardly from the hub 58 and is engaged between opposed springs 60 which are suitably seated within the housing by means of shoulders 61. Springs 60 thus center the hub 58 and enable a limited degree of motion of shaft 54 with respect to shaft 53. The foregoing connection is necessary in providing for motion of the driving element in a reverse direction with respect to the inflating device. Springs 60 serve to restore the driving shaft 54 to a normal position from which it is moved in one operation of the mechanism, to be described hereinafter.

Shaft 54 carries an arm 62 which engages a lug 63 (Figures 2 and 5) mounted upon a stationary element, such as a brake spider 64 upon the vehicle. The quantity of air which will be delivered to the tire is governed by the length of movement imparted to the bellows at each revolution of the wheel. For regulation of this length of movement and quantity of air, the extent of movement of arm 62 for each revolution of the wheel may be varied. The radial position of lug 63 may be varied by means of a plate 65 which is secured to the spider 64. Plate 65 is formed with a slot 66 within which lug 63 is received, a nut 67 being provided to secure the parts effectively in a desired position. A scale 68 may be placed upon the plate 65 in order that the degree of inflating may be varied in accordance with the average daily mileage of the vehicle. Lugs 63 may be provided with a roller 63' and projections 69 are formed upon arms 62 to eliminate overthrow and excessive vibration to which the parts may be subjected at certain speeds of operation. Extensions 69 are formed with set screws 70 which are adapted to engage a central plate 71 formed upon the fitting 55 and thus the screws 70 may be adjusted to accommodate the throw imparted to the arm 62 by the strike or lug 63 for a given set thereof.

When the strike or lug 63 moves arm 62, shaft 53 is actuated by the shaft 54 and ratchet wheel 52 moves wheel 49 through pawl 51. Reverse motion of wheel 49 is prevented by means of the pawl 50. Reverse motion of wheel 52 without reverse action being imparted to wheel 49 is allowed by means of pawl 51. Pinion 44 is thus rotated in a step by step fashion to reciprocate connecting rod 38 gradually. Each reversal of movement of connecting rod 38 initiates a pumping cycle in one of the bellows 26. In Figure 1, for example, the left hand bellows is starting upon a pumping stroke while the right hand bellows is drawing in air through valve 32. In order that the bellows may be completely exhausted of air and thus the full pumping force of the bellows obtained, air displacement members 72 are formed upon the fittings 31 and reinforcing and air exhausting plates 30 are provided on the bellows. The displacement members and reinforcing and air exhausting plates are so formed that the space within the bellows is completely filled thereby when the bellows are moved to an extreme exhausting position thereof. Figure 1 and Figure 7 illustrate the position of the parts just prior to the movement of the bellows into its contracted position.

The discharge ducts 33 lead to a chambered block 73 which is preferably mounted in the central section of the housing 21. As seen in Figure 4, the block 73 is provided with check valves 74 through which the contents of the respective ducts 33 flow. From the respective check valve 74 the fluid from the conduits 33 flows into a manifold 75 and a discharge duct 76. The discharge duct 76 communicates with a fitting 77 having an outlet 78 which communicates with the valve 79 of a tire 80. Fitting 77 is provided with an adjustable pressure relief valve 81 to prevent the accumulation of an excess pressure within the tire and manifold 75. Adjustment of valve 81 may be effected in an obvious manner by threading the same into or out of the casing 77 to vary the tension upon the valve spring.

The connection between the duct 78 and valve 79 is preferably accomplished by means of a fitting 82 which is formed as a barrel having internal threads which are adapted to engage the external threads of the valve 79. An adapter 83 is threaded within the valve 79 and is formed with a conical seat 84 which is adapted to engage a sealing ring 85. Duct 78 is provided with an enlarged extremity 86 which is received between the sealing ring 85 and fitting 82. In this fashion an effective fluid tight connection is afforded.

In the construction shown in Figures 8, 9, 10, and 11, only a single acting pump is provided. In this construction the housing 21 is adapted to receive two bellows of the character described in connection with the construction shown in Figures 1 through 7. Only one of the bellows, however, is utilized as a pumping member, this bellows being the right hand bellows as viewed in Figure 8. For this bellows, therefore, a fitting 31 is provided and a discharge duct 33 communicates with a valve chamber 87 through the air chamber of inlet valve 88. Inlet valve 88 permits fluid to be drawn into the right hand bellows from the outside through discharge duct 33 but prevents fluid from flowing in a reverse path from the bellows to the exterior. From the chamber 87, the fluid is directed through the tire through fitting 89 as described in connection with the structure illustrated in Figure 5. A relief valve 90 is provided in the valve chamber 87 to prevent excess pressure therein.

In order that the volume within the housing and between the housing and bellows may remain unchanged, a dummy bellows 91 is provided communicating with a fitting 92 which is open to the atmosphere. Movement of the pumping bellows therefore causes fluid to flow through the fitting 92 and the dummy bellows 91 preserves a constant volume between the bellows and the housing 21.

It is proposed to provide a driving mechanism for the device shown in Figures 8, 9, 10, and 11 which drives the pumping bellows in one direction only. A spring 93 is therefore provided to cause the bellows to return to an initial position preparatory to the contraction thereof in a pumping cycle.

Bellows 91 and bellows 26, in the construction shown in Figure 8, are tied together rigidly by means of a connecting rod 94, the rod being formed with a guide slot 95 and a stretch of teeth 96 which are engaged by a driving pinion 97. Driving pinion 97 is mounted upon a shaft 98 which is formed with a disc 99, adapted to be driven by a ratchet wheel 100 which is mounted upon a sleeve 101. A pawl 102 affords a driving connection between the ratchet wheel 100 and the disc 99, the movement of this pawl being controlled by a detent 103 which is attached to pawl 102, detent 103 being pivoted through the disc 99 at 104. Stops 103' and 103² mounted on disc 99 maintain detent 103 within the circumference of disc 99 during reverse motion of the disc. Shoulders 105 and 106 are formed on the connecting rod 94 and are adapted to engage the detent 103 to move the pawl 102 into or out of engagement with the ratchet wheel 100.

Upon sleeve 101, a ratchet wheel 107 is formed, a stationary spring-pressed pawl 108 engaging the wheel to prevent reverse movement thereof. Upon one face of the ratchet wheel 107 a spring-pressed pawl 109 is formed to transmit forward motion to ratchet wheel 107 and to allow reverse movement of ratchet wheel 110 without imparting such reverse movement to ratchet wheel 107. This pawl 109 engages teeth in the periphery of a driving wheel 110 which is connected upon a driving shaft 111. Driving shaft 111 is provided with a collar 112 upon one surface of which corrugations 113 are formed to be engaged by similar corrugations formed upon a sleeve 114. This sleeve is slidably mounted upon shaft 111 and is limited to axial movement by means of keys 115 which engage slots 116 formed in the sleeve. A spring 117 normally urges the sleeve outwardly against collar 112 and thus preserves shaft 111 in predetermined angular positions.

Upon the end of shaft 111, a star wheel 118 is mounted, a lost motion connection 119 being provided therebetween similar in construction to the connection shown in Figure 6. Actuation of the arms of star wheel 118 by a roller detent 120 causes a step by step motion to shaft 111, the shaft being snapped positively into predetermined positions by the spring clutch construction including the corrugated members 112 and 114. The step by step motion is transmitted to the driving pinion 97 through the mechanism just described and connecting rod 94 is thus moved to actuate bellows 26 in its pumping or collapsing stroke. When the bellows has been moved to the position shown in Figure 8, shoulder 105 engages detent 103 to disengage pawl 102 from the ratchet wheel 100. This disconnects the driving elements and permits spring 93 to pull the connecting rod to the left, as viewed in Figure 8 and open the bellows 26.

By adjusting the relief valve 90, the air pressure to be supplied to the tire may be regulated to a given amount while the quantity of air pumped by the system may be regulated as in the construction shown in Figures 1 to 7 by means of the adjustable strike 120. The position of this strike may be varied upon mounting plate 65 in the manner described in connection with the corresponding elements of Figures 1 to 8, or may be as shown and described in connection with Figure 18.

In the construction shown in Figures 12 through 17, a further modified form of the invention is shown and includes a single bellows 121 actuated by a connecting rod 122 which is formed with a continuous internal track 123 having upper and lower stretches and a guide rib 124 to maintain a driving pinion 125 in engagement with the teeth of the track 123. Screened apertures 126 are provided in the housing 21 to prevent compression of the fluid within the housing and a discharge duct 127 is provided to communicate with a removable valve fitting 128 which is secured to the standard valve stem 129 of a pneumatic vehicle tire and which is provided with a movable sleeve 128' for an air-tight connection. The valve fitting 128 is provided with a manifold 130 to which the duct 127 is connected and an air inlet valve 131 is provided in the fitting 128 in order that air may be drawn into the duct 127, and bellows 121. The fitting is also provided with a valve 132 which is a regulated safety valve and permits the escape of air in the event that a pressure in excess of that required for the tire is produced by the bellows 121 and associated mechanism. A third valve 133 is provided and threaded into the fitting coaxially with respect to the valve 129, the third valve having a standard valve rod 134 and valve head 134' and spring 135. Upon the bottom of the rod 134, a sleeve 136 is slidably mounted, this sleeve having an enlarged base 137 to engage the upper extremity of the valve rod 138 within the main valve 129. The pressure on valve head 134' and spring pressure relief for spring 129' at main valve 129 is regulated by screw cone 134². Duct 127 communicates with the valve 133 through a port 139. Valve 133 thus serves to provide pressure at valve head 134' and as a pressure relief for spring 129' at the main tire valve and also as an auxiliary inflating and deflating valve, as well as a test valve of usual form.

In order that pinion 125 may be suitably actuated, a strike 140, similar to the construction shown in Figure 2, is mounted upon a shaft 141 within which a driving shaft 142 is centered. Shaft 141 drives a collar 143 which drives a sleeve 144 through a fitting illustrated in Figure 17 at 145. This fitting is similar in construction and operation to the connection illustrated in Figure 6, springs 146 being provided to properly center the arm 140 after each actuation by the adjustable lug mechanism shown in Figures 13 and 2 and described hereinbefore. Sleeve 144 carries a ratchet wheel 147 which engages a spring-pressed pawl 148 mounted upon a ratchet wheel 149 which is secured to the shaft 142. Pinion 125 is mounted upon shaft 142 and therefore is driven through the mechanism just described. A stationary spring-pressed pawl 150 prevents reverse rotation of ratchet wheel 149 in a manner which will be readily apparent from an inspection of Figure 17. Spring-pressed pawl 148 allows reverse rotation of ratchet wheel 147 without imparting such reverse action to ratchet wheel 149.

The operation of the mechanism shown in Figures 12 through 17 is such that the arm or strike 140 serves to actuate pinion 125 continuously and thus cause the connecting rod 122 to be reciprocated in a step by step fashion. During this operation, the connecting rod 122 moves about the driving pinion in order that the same may traverse the upper and lower stretches of teeth formed in the connecting rod in a manner which will be readily understood.

Figure 17:
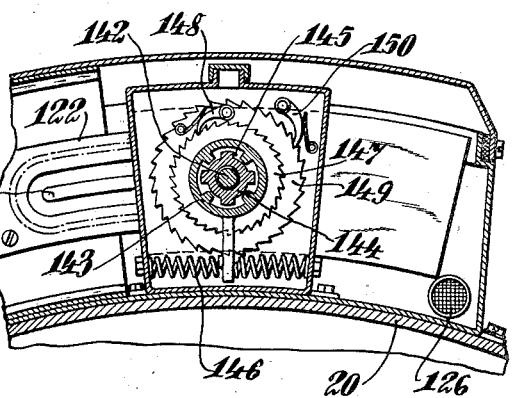
Figure 17 is a view in section, taken on line 17—17 of Figure 16, and looking in the direction of the arrows.
Figure 18:
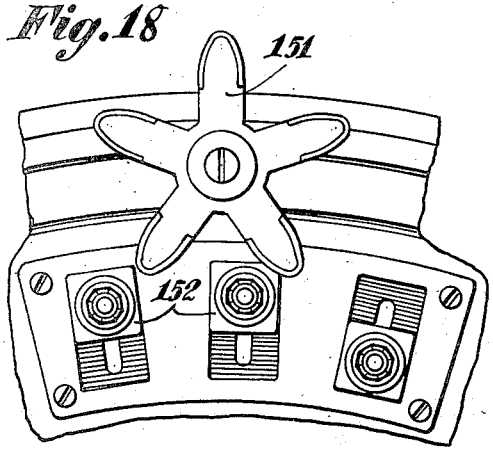
Figure 18 is a view in end elevation, similar to Figure 13, showing a modified form of actuating device.
Figure 19:
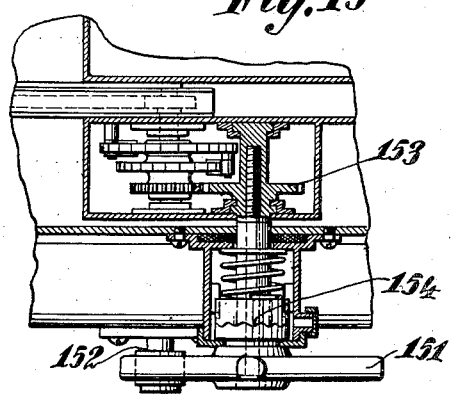
Figure 19 is a plan view of the mechanism shown in Figure 18.

Figures 18 and 19 show a further modified structure wherein continuous rotation is imparted to the form of driving mechanism illustrated in Figures 17 and 18 by means of a star wheel 151 which is actuated by a series of adjustable lugs or detents 152. Each lug or detent actuates one of the arms of the star wheel to advance a driving pinion 153 to a predetermined extent as defined by the span of the corrugations of a positioning clutch 154, similar in construction and operation to the clutch mechanism illustrated in Figures 9 and 10. From the foregoing, it will be apparent that an inflating mechanism has been provided which may be regulated to maintain automatically a predetermined pressure within a tire and the mechanism may be regulated to vary the quantity of fluid pumped. In the forms shown in Figures 1 through 11, the housing for the mechanism may be filled with a lubricant and effectively sealed in order that the device may be lubricated effectively and not become impaired by the presence of foreign matter within the actuating mechanism.

While the invention has been described with specific reference to the accompanying drawings, it is not to be limited, save as defined in the appended claims.

I claim as my invention:

1. A fluid pump comprising an air directing means, an extensible and contractible bellows communicating with the air directing means, means to actuate the bellows, a guide for the bellows, and guide engaging members on the outer folds of the bellows, said members being formed of sufficient width to prevent contacting of the adjacent outer walls of the bellows folds.

2. A fluid pump comprising an air directing means, an extensible and contractible bellows communicating with the air directing means, means to actuate the bellows, a guide for the bellows, and exhaust plates on the inner sides of the bellows walls.

3. A fluid pump comprising an air directing means, an extensible and contractible bellows communicating with the air directing means, means to actuate the bellows, a guide for the bellows, and exhaust and stiffening plates on the inner sides of the bellows walls.

4. A fluid pump comprising an air directing means, an extensible and contractible bellows communicating with the air directing means, means to actuate the bellows, a guide for the bellows, and exhaust and stiffening plates on the inner sides of the bellows walls, said plates being thinner adjacent the outer fold than adjacent the interior of the bellows.

5. A fluid pump comprising an extensible and contractible bellows having a plurality of folds, means to extend and contract the bellows, a guide for the bellows, and guide engaging members on the outer folds of the bellows, said members being formed of sufficient width to prevent contacting of the adjacent outer walls of the bellows folds.

WILLIAM NEIL SMITH.